United States Patent Office 2,910,600
Patented Oct. 27, 1959

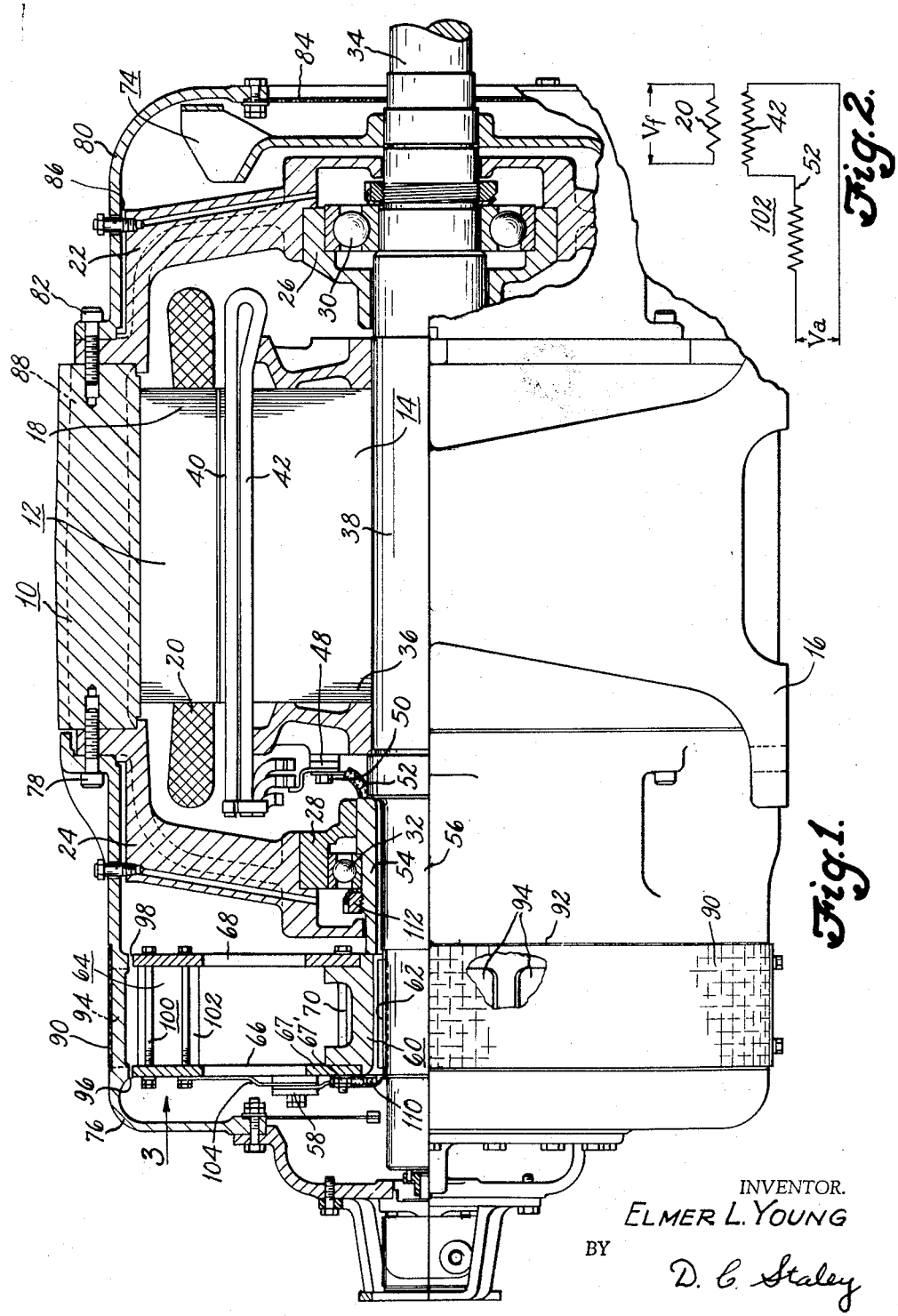

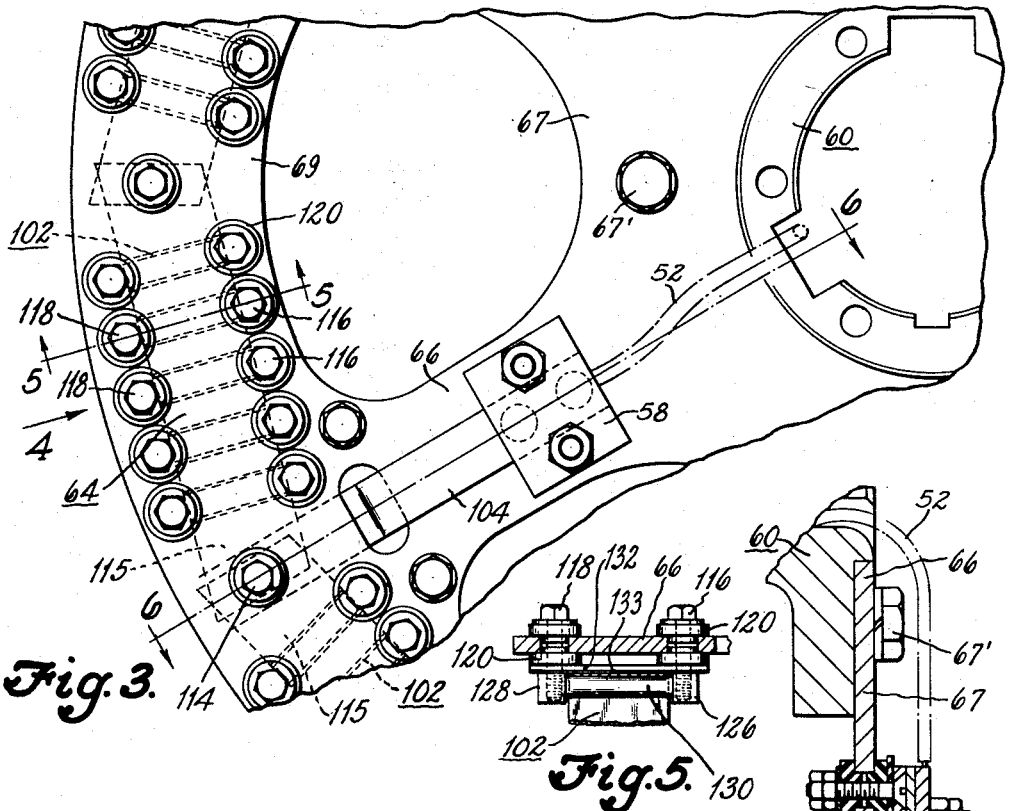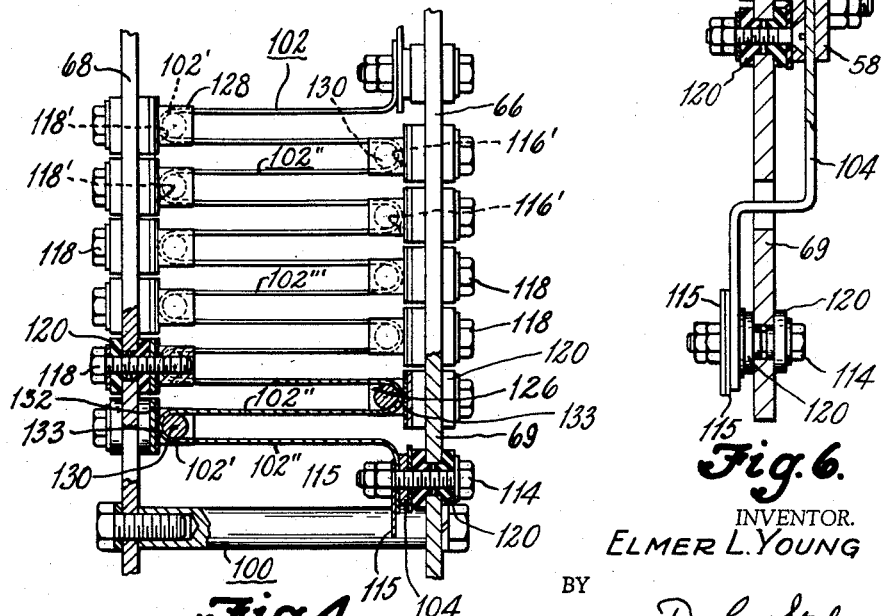

2,910,600

ROTOR WITH HEAT RADIATING MEANS

Elmer L. Young, Dayton, Ohio, assignor to General Motors Corporation, Detroit, Mich., a corporation of Delaware Application August 5, 1957, Serial No. 676,150

6 Claims. (Cl. 310—72)

This invention relates to rotors for electrical machines, and particularly, to a rotor with an auxiliary heat radiating means.

An object of this invention is to provide an improved means for dissipation of heat losses from an electrical rotor.

Another object of this invention is to provide a totally enclosed electrical machine having rotor heat losses due to high slip characteristics with heat dissipating means connected to rotor windings located outside the enclosed machine in a cooling air stream.

Another object is to provide a totally enclosed motor with dissipating means for rotor heat losses using an external rotor shaft extension on which resistance connected with the rotor windings is movable in a cooling air flow.

Another object is to provide an enclosed electrical rotor with windings of low resistance to keep overheating to a minimum while connected thereto on a shaft extension there is a resistance grid rotatable in a cooling air stream external of the enclosed motor for dissipation of rotor winding high heat losses.

Another object is to provide an electrical motor with an auxiliary heat radiating fan including in combination, blades of a fan with an external resistance grid connected to the rotor windings all of which are mounted on a rotor shaft portion or extension.

Further objects and advantages of the present invention will be apparent from the following description, reference being had to the accompanying drawings wherein a preferred embodiment of the present invention is clearly shown.

In the drawings:

Figure 1 is a partially sectioned elevational view of an electrical machine embodying the present invention.

Figure 2 is a wiring diagram for the machine of Figure 1.

Figure 3 is a fragmentary view from arrow 3 in Figure 1.

Figure 4 is a fragmentary view from arrow 4 in Figure 3.

Figure 5 is a view taken along line 5—5 of Figure 3.

Figure 6 is a view taken along line 6—6 of Figure 3.

Referring to Figure 1, the drawings illustrate an electrical machine generally comprising a housing 10, stator field windings 12 within the housing, and an electrical rotor 14 located with the field windings in a conventional manner. The housing 10 includes a frame 16 into which are fitted stator laminations 18 forming a stator assembly having conventional slots therein aligned relative to each other for receiving wire placed to form coil assemblies such as indicated by the numeral 20 collectively making up the field windings 12. The frame has attached on opposite sides thereof a pair of end frames 22 and 24, respectively, to which are fitted bearing housings 26 and 28, respectively. The bearing housings provide journalling support for bearings 30 and 32 of a conventional type for rotatably supporting a rotor shaft 34. The rotor shaft 34 carries the rotor assembly indicated by numeral 14 which includes rotor laminations 36 prefitted or otherwise suitably secured to an intermediate portion 38 of rotor shaft 34. The laminations 36 are stacked in aligned relationship relative to each other so as to form slots 40 in their outer radial periphery for receiving rotor windings indicated by numeral 42. The electrical machine described thus far is preferably an induction electric motor of a horsepower rating such as 125 H.P. The motor construction described is more or less conventional to this point and the particular induction electric motor is totally enclosed by end frames 22 and 24 as well as frame 16 and has a tendency to overheat due to high heat losses or high rotor losses required to get high slip characteristics. One of the limitations on power of the totally enclosed motor is the ability to dissipate these high rotor heat losses while obtaining the high slip characteristics.

The motor of the present invention provides an improved means for dissipation for these heat losses from an electrical rotor by providing the following additional structure illustrated in the drawings.

Figure 1 shows leads 46 of the rotor windings brought to a terminal block 48 where an electrical connection 50 is made to a wire 52 which is guided through a cylindrical bushing or sleeve 54 to a location outside the end frame 24 of the motor. The wire 52 is disposed between the inner periphery of the bushing 54 and a reduced diameter portion 56 of the shaft 34 and is not movable relative to the rotatable shaft. The wire 52 necessarily is stationary relative to the shaft as it moves with the rotating shaft in a journal support provided between bushing 54 and bearing 32. The wire 52 is connected external of the motor enclosure to a terminal block 58 after being inserted or located axially of the shaft 34 radially inside a hub or fan member generally indicated by numeral 60. The hub is secured to rotate with the shaft by a connecting means such as a key 62 disposed between the hub and shaft 34 in a conventional manner. The hub 60 forms a portion of an auxiliary heat radiating means generally indicated by numeral 64 provided with the electrical machine in accordance with the present invention.

The auxiliary heat radiating means comprises, in addition to the hub 60 a pair of annular plates 66 and 68 which are attached radially thereof by means of bolts 70. The auxiliary heat radiating means 64 is totally separate and apart from a conventional fan 74 which may or may not be provided on shaft 34 remote from the heat dissipating means at an end of the shaft opposite that on which the auxiliary heat radiating means 64 is attached. The auxiliary heat radiating means 64 is enclosed by a cover 76 attached to the frame 16 using bolts such as 78 which also place end frame 24 into rigid relationship with frame 16. Similarly, a fan cover 80 is provided to enclose the conventional fan 74 and is attached through bolts 82 to the frame 16 together with end frame 22. A screen 84 is provided with the fan cover 80 permitting the fan 74 to circulate air by way of the screen 84 through space 86 between cover 80 and end frame 22 inside the motor assembly in a conventional manner. Also provided are conventional axial air ducts 88 in the outer periphery of the stator frame 16 for cooling purposes relative to the stator windings.

The cover 76 for the auxiliary heat radiating means 64 is provided with a screen 90 located around a peripheral portion 92 of cover 76 having openings 94 provided radially outwardly of the hub 60 on shaft 34. The purpose of the screen 90 together with the openings 94 radially outwardly of the hub 60 is apparent from the following description.

The annular fan plates 66 and 68 of the auxiliary heat radiating means 64 extend radially from the hub 60 to gaps 96 and 98, respectively, between plates 66 and 68 at an inner peripheral location of the cover 76. The gaps 96 and 98 provide clearance between the cover and the auxiliary heat radiating means as the latter are rotated by shaft 34 of the electrical machine. The fan plates 66 and 68 are maintained in predetermined spaced relationship relative to each other at a longitudinal axial dimensional distance corresponding to the longitudinal dimension of the hub 60 by means of spacing means or bolts indicated generally by numeral 100. Heat dissipating means generally indicated by numeral 102 are secured between the fans plates 66 and 68 as indicated in Figure 1. This heat dissipating means preferably comprises a high resistance material connected by a conductor 104 to the wire 52 at terminal block 58.

The resistance or heat dissipating means 102 are indicated schematically in an electrical diagram of Figure 2 and are connected in series through the wire 52 with the rotor windings 42. The field windings 12, formed of coil assemblies such as 20, are electrically and magnetically associated with the rotor windings 42, in a conventional manner. The resistance or auxiliary heat dissipating means 102 are built into or as a part of a fan for creating a cooling air stream passing through the screen 90 and openings 94 with the cover 76. Thus a flat strip resistance grid material preferably is used to provide both resistance and blades of a fan forming an auxiliary heat radiating means 64. Use of a conventional fan 74 rotatable with shaft 34 as described above is optional because a fan is already provided by the grid material. Preferably the resistance of rotor windings 42 is kept low so that heat losses are concentrated in the resistance grid means 102 of the auxiliary heat radiating means 64 of the present invention. Thus heat losses from the rotor are concentrated externally of the conventional motor frame assembly formed of frame 16 and end frames 22 and 24. The terminals of the more or less conventional motor windings as used in the motor are brought outside the motor enclosure by a passage inside bushing 54 to the auxiliary heat radiating means 64. The bushing 54 is tightly held axially against the shaft 34 by any suitable means such as by screws 110 or by a tight fit of hub 60 axially secured against bushing 54. A bearing location nut 112 fixes an inner raceway of bearing 32 relative to the bushing 54 on shaft 34.

Details of the auxiliary heat radiating means 64 of the present invention are more clearly visible in a fragmentary plan view of Figure 3 illustrating an end view of the hub 60 and fan plate 66. As seen in Figure 3, each fan plate has an inner radial portion 67 which is connected by bolts 67' to the hub 60. The fan plate 66 is also provided with an outer annular radial portion 69. The fragmentary view of Figure 3 includes a showing of terminal block 58 referred to with Figure 1 for connection of wire 52 to conductor 104. The conductor 104 provides connection from terminal block 58 to a connector or nut and bolt 114 to which an end 115 of the resistance grid 102 is connected.

Figure 4 is a fragmentary developed view of the auxiliary heat radiating means 64 of the present invention and shows more clearly how the end 115 of the resistance grid 102 is attached by conductor 104 relative to the outer annular radial portion 69 of the fan plate 66. Figure 4 further shows one of the spacing bolts 100 provided to maintain the fan plates 66 and 68 in predetermined spaced relationship relative to each other. The developed view of Figure 4 further shows how the resistance grid 102 is folded over relative to itself to form an accordion-like or sandwich structure having semi-circular looped ends 102' and longitudinal portions substantially parallel to and extending radially of the resistance grid portions marked 102'' and 102''' as the resistance grid progresses annularly about the outer radial periphery of the auxiliary heat radiating means 64 of the present invention. The parallel spaced relationship of the resistance grid 102 at the outer periphery between plates 66 and 68 is indicated by the dotted lines representing the resistance grid 102 in Figure 3. It is to be understood that the resistance grid has a greater radial dimension extending between bolts 116 and 118 for example than the thickness of an individual segment of resistance grid material. Thus in effect the accordion-like spacing of the resistance grid provides a fan or fan-like structure between the fan plates 66 and 68 with a longitudinal dimension corresponding substantially to the predetermined axial distance maintained between plates 66 and 68. The semi-circular loop portions 102' of the resistance grid each are preferably placed into an insulating socket 116' or 118' mounted by means of the bolts 116 and 118 relative to the fan plates, respectively. Thus the grid is completely insulated electrically from the fan plates 66 and 68. The insulating pieces 116' and 118' can also be made of porcelain or of a conducting material which is porcelain plated so as to insulate the resistance grid means from the fan plates 66 and 68. The resistance grid means can be formed of continuous material extending 360° around shaft 34 between plates 66 and 68 or it can be formed of sections in quadrants as shown in Figure 3 capable of being connected in series relationship to each other to form a circuit as indicated schematically in Figure 2. In any event, the shaft 34 carrying the rotor, fan 74, and auxiliary heat radiating means 64 must be balanced. Balance may be achieved in any conventional manner.

As seen in cross sectional fragmentary views of Figures 4, 5 and 6, the bolts 114, 116 and 118 as well as screws used to mount terminal block 58 relative to plates 66 or 68 preferably are located therewith by insulating bushings 120. The insulating bushings 120 fit around each bolt and provide resilient mounting for the grid means as well as the terminal block 58. The grid means mounting can be further seen in Figure 5 where a pair of blocks 126 and 128 are shown attached to plate 66 by bolts 116 and 118, respectively, with bushings 120 providing resilience and insulation relative to plate 66. Blocks 126 and 128 together with tie rods or bars 130 form the insulating sockets 116' and 118' relative to which loop portions 102' of grid means 102 are placed. To further insure insulation of grid means 102 from fan plates 66 and 68, each insulating socket can be provided with a shielding means. This shielding means preferably is in the form of a rectangular metal piece 132 covered on one side with insulating material 133 such as porcelain. Each piece 132 is provided to span space between each loop portion 102' and a fan plate by the mounting as provided between blocks 126 and 128 and insulating bushings 120 relative to bolts 116 and 118. The grid means 102 are held tightly relative to plates 66 and 68 by blocks 126 and 128 with tie rods 130 forming the insulating sockets 116' and 118'. The electrical connection between conductor 104 and the grid means can best be seen in Figures 3, 4 and 6 with a phantom representation of wire 52 being shown in Figures 3 and 6 for connection to conductor 104 at terminal block 58 by any suitable means in a conventional manner.

The present invention makes it possible to provide a motor rotor with windings of relatively low resistance causing relatively low internal heat losses to avoid overheating in the electrical machine where high rotor losses are required to get high slip characteristics such as on an induction electric motor of high horsepower rating. The high heat losses are dissipated by auxiliary heat radiating means 64 using resistance such as grid means 102 connected by the wire 52 to the rotor windings at a location external to the motor housing and providing flat resistance grid elements functioning like fan blades for creating air turbulence within cover 76 relative to openings 94 and the screen 90 to create a cooling air stream relative to the resistance grid means. It is to be understood that the resistance 102 could also be a wire resistance material which is located or mounted adjacent to or on individual fan blade elements disposed between fan plates 66 and 68. In any event, a more or less conventional motor stator and rotor windings assembly can be operated without overheating and with dissipation of heat loss without having the cooling flow of air pass through the motor stator and rotor windings. This is made possible by the external provision of auxiliary heat radiation means 64 providing combined resistance and fan functions in accordance with the present invention.

While the embodiment of the present invention as herein disclosed constitutes a preferred form, it is to be understood that other forms might be adopted.

What is claimed is as follows:

1. A heat dissipating means for use with an electrical machine having a stator and a rotor including windings from which high rotor heat losses must be dissipated, comprising, a rotatably supported shaft on which the rotor and rotor windings are carried, a resistance grid means located externally of the machine on said shaft, means for electrically connecting said grid means with the rotor windings, and means for supporting said grid means on said shaft externally of the machine and for guiding said connecting means to be held immovable relative to the rotatable shaft, said grid means being formed of folded continuous substantially longitudinally-extending accordion portions located annularly about an outer radial periphery of said supporting means to create air turbulence like a fan for cooling and dissipation of heat away from said grid means.

2. The heat dissipating means of claim 1 wherein said supporting means includes a hub mounted on said shaft, a pair of annular fan plates mounted radially of said shaft on said hub in predetermined spaced relationship to each other, and a cover with openings radially of said hub for permitting air turbulence and air flow relative to longitudinally-extending portions of said grid means, said cover being attached to the electrical machine.

3. An electrical machine, comprising, a housing for enclosing a stator and rotor, a shaft journalled in said housing, rotor windings with the rotor on said shaft, stator windings with the stator in said housing and electrically associated with said rotor windings, and means for heat dissipation of rotor losses including a hub carried on said shaft externally of said housing, a pair of radially outwardly extending plates on said hub, spacing means interconnecting said radially extending plates and adapted for maintaining predetermined spaced relationship between said plates relative to each other at a longitudinal axial dimension corresponding to the longitudinal dimension of said hub, insulating socket means provided on each of said radially extending plates, and resistance grid means formed of sections of a flat strip folded over relative to itself to form accordion-like longitudinal portions substantially parallel to each other radially and interconnected by semi-circular looped ends positioned relative to said insulating socket means on each of said radially extending plates, said accordion-like longitudinal portions forming a fan intermediate said insulating socket means.

4. The machine of claim 3 wherein one of said radially extending plates carries a terminal block relative to which electrical connection is made between said rotor windings and said accordion-like resistance grid means formed of relatively high resistance material all connected in series with said rotor windings.

5. A heat dissipating means for use with an electrical machine having a stator and a rotor including windings from which high rotor heat losses must be dissipated, comprising, a rotatably supported shaft on which the rotor and rotor windings are carried, a hub means including a pair of axially spaced radially extending plate portions carried to be immovable relative to said rotatable shaft, insulating socket means provided in alternate positions relative to each other on one side of each of said plate portions facing each other, and resistance grid means having ends positioned relative to said insulating socket means and having longitudinally extending parallel portions spaced from each other as fan blades connected in series relationship to each other relative to said rotor windings.

6. The heat dissipating means of claim 5 wherein said insulating socket means includes a plurality of pairs of radially spaced blocks attached to each of said axially spaced radially extending plate portions, and tie bars extending substantially radially and supported at opposite ends by said radially spaced blocks, said resistance grid means being looped relative to said tie bars for positioning relative to said insulating socket means between which said longitudinally extending parallel portions are exposed to cooling air flow turbulence created by rotation of said hub means along with said rotatable shaft.

References Cited in the file of this patent

UNITED STATES PATENTS

| | | |
|---|---|---|
| 1,587,760 | Connell | June 8, 1926 |
| 1,685,677 | Maxwell | Sept. 25, 1928 |
| 1,789,294 | Ballman | Jan. 20, 1931 |